April 18, 1950 L. T. SACHTLEBEN ET AL 2,504,591

UNITARY RECORDING AND OPTICAL SYSTEM

Filed April 24, 1947 4 Sheets-Sheet 1

Inventors
LAWRENCE T. SACHTLEBEN
& JAMES L. PETTUS

By Carl R. Goshaw

Attorney

April 18, 1950 L. T. SACHTLEBEN ET AL 2,504,591

UNITARY RECORDING AND OPTICAL SYSTEM

Filed April 24, 1947 4 Sheets-Sheet 2

Inventors
LAWRENCE T. SACHTLEBEN
& JAMES L. PETTUS

By Val R. Goshaw

Attorney

April 18, 1950 L. T. SACHTLEBEN ET AL 2,504,591

UNITARY RECORDING AND OPTICAL SYSTEM

Filed April 24, 1947 4 Sheets-Sheet 3

Inventors
LAWRENCE T. SACHTLEBEN
& JAMES L. PETTUS

By Orl R. Goshaw

Attorney

Inventors
Lawrence T. Sachtleben
& James L. Pettus
By Val R. Goshaw
Attorney

Patented Apr. 18, 1950 2,504,591

UNITED STATES PATENT OFFICE 2,504,591

UNITARY RECORDING AND OPTICAL SYSTEM

Lawrence T. Sachtleben, Haddonfield, N. J., and James Lawrence Pettus, Sherman Oaks, Calif., assignors to Radio Corporation of America, a corporation of Delaware Application April 24, 1947, Serial No. 743,620

8 Claims. (Cl. 179—100.3)

This invention relates to sound recording systems and particularly to the optical unit of such systems whereby light is provided, modulated, monitored, and properly directed to the light sensitive surface of a film.

In the usual type of sound recording equipment the essential portions thereof consist of a film drive which advances the film at a uniform rate past the point of light impression, and an optical unit adapted to vary the light either in shape or intensity in accordance with the variations of the sound waves being recorded. The present invention is directed to an optical unit which consists of several sub-assemblies mounted and adjusted as an integral unit and which is easily attachable and detachable from the remaining mechanism of the recorder. The present invention not only involves the production and modulation of the recording light beam but also the production of several monitoring light beams for adjusting and observing the light source, and the action of the modulator during the recording of a signal. The intensity of the light beam may also be measured and the signal monitored as actually being impressed on the film. Several units of the present invention have been disclosed and claimed in copending applications which will be referred to as the units are described hereinafter.

The arrangement of the various optical components permits of simplification in the manufacturing of the unit, provides flexibility of construction and wide clearances to facilitate assembly, removal and the repairing of parts. The entire unit occupies a space approximating 8 x 8 x 11½ inches and is light in weight, weighing approximately 8½ pounds.

The optical arrangement of the various lenses and reflectors, particularly for monitoring, has been disclosed and claimed in Sachtleben copending application, Serial No. 742,360, filed April 18, 1947, while the modulating and recording optical system has been disclosed and claimed in Sachtleben U. S. Patent No. 2,436,671 of February 24, 1948.

The principal object of the invention, therefore, is to facilitate the modulation and monitoring of a light beam used in the recording of sound on film.

Another object of the invention is to provide an improved method of and means for producing, adjusting, directing, and monitoring a recording light beam.

A further object of the invention is to provide an improved method of and means for producing, directing and observing a monitoring light beam used in sound recording.

A still further object of the invention is to provide a unitary optical system attachable and detachable from a film advancing apparatus as a unit and the component parts of which may be easily adjusted and serviced.

A still further object of the invention is to provide a unitary recording and optical system for a sound recorder which occupies a minimum of space and provides the maximum in flexibility and control.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 5 is a detail view of one of the elements of the monitoring system;

Figure 1:
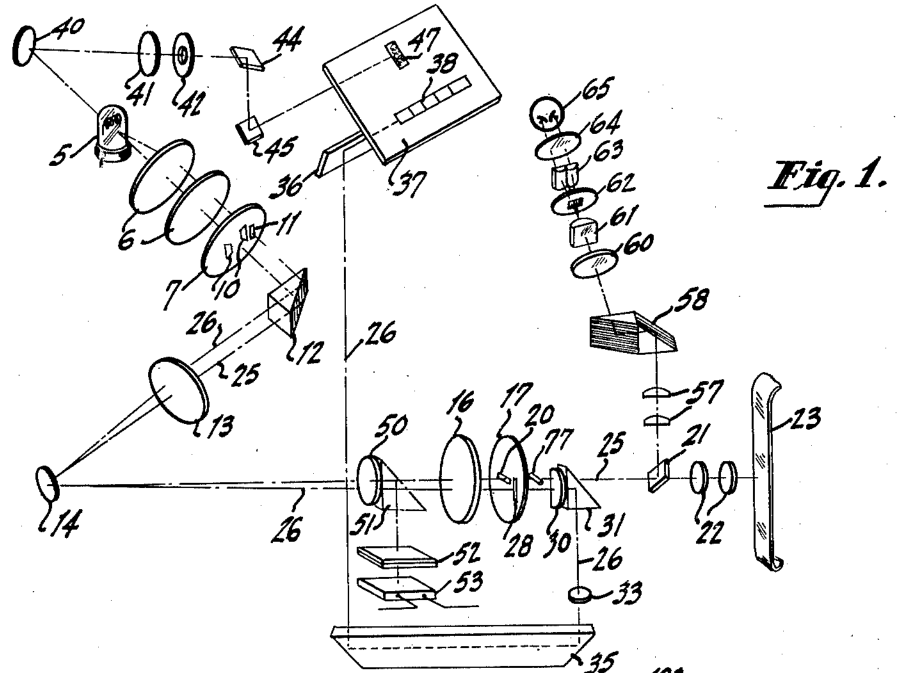
Fig. 1 is a diagrammatic perspective view of the optical elements of the invention.

Referring now to the drawings in which the same numerals identify like elements, and particularly to Fig. 1, a light source in the form of a lamp 5 provides light for the recording system. The light from the lamp 5 is collected by lenses 6 and projected to an aperture plate 7, which will produce a class A type of sound record. Other types of recording apertures may also be used as disclosed and claimed in Sachtleben co-pending application, Serial No. 742,360, filed April 18, 1947. Aperture plate 7 is provided with two sound track apertures 10 and a vertical rectangular monitoring aperture 11. Emergent light from the apertures 10 and 11 is reflected at right angles by a prism 12 and then projected by a lens 13 to a mirror 14 of the modulating galvanometer. From the mirror 14 the light passes through a slit condenser lens 16 to a slit mask 17, the sound recording light beam passing through a horizontal narrow slit 20, through a dichroic monitoring reflector 21, an objective lens 22 to a film 23. A light filter may also be inserted between the reflector 21 and the objective lenses 22. This general type of sound recording optical system is disclosed and claimed in the above mentioned Sachtleben U. S. Patent No. 2,436,671 of February 24, 1948.

The sound recording light beam has been indicated by the broken line 25 while the monitoring light beam passing through the aperture 11 has been indicated by the broken line 26. The monitoring light beam through the aperture 11 passes through the same optical elements as the recording light beam between the light source 5 and the slit plate 17 at which point it passes through a vertical rectangular monitoring window 28.

The image of the aperture 11 in mask 7 is caused to fall in the plane of the slit plate 17 by the prism 12, lens 13, and lens 16. The light of the recording beam passing to the film 23 forms an image of the mirror 14 in the objective lens 22 through the action of condenser lens 16. The light through the aperture 11, vibrates in accordance with the recording light beam to the film 23 since both are modulated by mirror 14, the monitoring beam, however, being intercepted by a lens 30 which is cemented to a prism 31 positioned behind the window 28. This light, as shown by ray 26, is incident upon lens 30 at a point near its edge which is closest to the main optical axis shown by ray 25. The optical center of lens 30 is somewhat farther removed from the main optical axis so that the lens 30 exhibits a prismatic action rendering the axis or principal ray of the monitoring beam parallel to the main optical axis upon refraction at the first surface of lens 30, so that this ray remains in a vertical plane parallel to the main optical axis until it is reflected to the monitoring screen.

After refraction by lens 30, the monitoring light is reflected downwardly by prism 31 to a spherical lens 33. The curvature of the first surface of lens 30 is such that a stationary image of mirror 14 is formed in lens 33, whose power is such that an image of the plane of window 28 is finally formed on the monitoring screen at a magnification of approximately five times. Lens 33 is adjustable axially for focus.

From lens 33 the monitoring light passes to an isosceles trapezoidal prism 35 which carries the light to the rear toward the mirror 14 and then directs it vertically to a front surfaced plane mirror 36 positioned behind a translucent rear projection screen 37 to which the monitoring light is reflected. The screen 37 is tilted about its lower edge to make an acute angle of about 30° with the vertical such that the light from the mirror 36 strikes the screen 37 perpendicularly to form image 38. This arrangement of the screen 37 permits the image 38 to be viewed coincident with the line of projection of light from the mirror 36. As screen 37 is positioned at about 48 inches above the floor when attached to the recorder, the average observer's line of sight will coincide with the line of projection to provide maximum brightness of the image 38. Also, keystoning of the image 38 will be avoided since the projection axis is not tilted with respect to the surface of the screen.

In addition to monitoring the mirror vibrations the condition of the filament of the lamp 5 is also indicated on the screen 37. The optical system for the light sources includes a reflector 40 which reflects light in a horizontal plane to a spherical lens 41 behind which is an aperture plate 42. The light is then reflected downwardly by mirror 44 to a mirror 45 which projects the light at an angle of approximately 30° to the horizontal to the screen 37 as shown by image 47. Thus, the beam of light from mirror 45 strikes the screen 37 at right angles and suffers no keystone effects and is parallel with the line of light from the mirror 36 to the screen 37. As the image 47 may be viewed coincident with the axis of the light beam producing it, maximum brightness is provided. The magnification of the filament is substantially 3.75 times.

To provide a light meter for the modulating beam, an optical unit comprising a spherical lens 50 and reflecting prism 51 cemented together may be inserted in the beam of light whenever it is desired to read its intensity. The elements 50 and 51 are mounted so they do not normally intercept the beam 25 and are inserted into the beam whenever a reading is desired. They have, therefore, been shown in dotted lines. The intercepted light beam is projected downwardly by prism 51 through a pair of plates 52, one of which may be a filter, to a photo-voltaic cell 53, to which may be connected any suitable type of meter. A meter system of this general type is disclosed and claimed in Collins U. S. Patent No. 2,233,914 of March 4, 1941.

For the purpose of monitoring the signal being recorded, a dichloric reflector 21 positioned in the light beam reflects the red end of the spectrum upwardly through a pair of cylindrical lenses 57 to a double reflecting prism 58. The light from the prism 58 passes through a plane glass plate 60, a cylindrical lens 61, the aperture of a plate 62, a pair of splitting cylindrical lenses 63, plane glass plate 64 to a push-pull photo-electric cell 65. The lenses 57 image the slit on the lenses 63. The cell 65 may be connected to a pair of head-phones or a loud-speaker for monitoring the light variation as impressed on the film 23. A monitoring system of this basic type using a dichroic reflector is disclosed and claimed in Dimmick U. S. Patent No. 2,314,392 of March 23, 1943.

As an illustration of a practical monitoring system for the visual observation of the degree of modulation and the condition of the light source, the distance from the plate 17 to the reflecting surface of the prism 31 was .405 inch, while the distance from the prism 31 to the reflecting surface of the trapezoidal prism was 1.625 inches. The light was reflected rearwardly a distance of 1.812 inches and then upwardly to the reflecting surface of reflector 36 a distance of 2.561 inches. The dimensions of the optical path for the filament image 47 are as follows: the reflector 40 is positioned 1.375 inches from the filament of lamp 5, while the reflector 44 is positioned 2.272 inches from the mirror 40, the lower mirror 45 being .426 inch below mirror 44. The distance of projection from mirror 45 to screen 37 was 7.773 inches. For purposes of comparison the vertical distance from reflector 21 to prism 58 was 1.688 inches, while the distance from reflector 58 to photo-cell 65 was 2.032 inches. In the meter unit, the distance from the reflecting surface of prism 51 to the light cell 53 was 2.5 inches.

Referring now to the mechanical mounting and positioning of the above described optical elements, reference is made to Figs. 2 through 10, inclusive, in which the various optical elements of Fig. 1 are shown mounted as sub-assemblies on a base 70 which is, in turn, attached to the recorder base by screws such as shown at 71 passing through elongated holes 72. The position of the entire unit with respect to the film may be adjusted in holes 72 under control of fine pitch lateral adjusting screws 75.

Beginning with the source of light for the system, the first sub-assembly consists of the lamp 5 enclosed within a cover 76 and mounted on a self-locking socket equipped with a pressure release key 79. This unit is disclosed in detail and claimed in Pettus co-pending application, Serial No. 739,007, filed April 21, 1947. This unit includes a mica-glass composition insulator 79a placed between the socket and the assembly base for thermal and electrical insulation. The entire assembly may be oriented in a horizontal plane on the main base casing 70 by screws 81 in elongated holes, while vertical adjustment of the lamp is obtained by the rotation of a pinion shaft 82 adapted to rotate a gear 83. The cover 76 has an opening 85 therein through which the recording and monitoring light beams are projected, while the cover also has a smaller opening in the rear for monitoring the filament of the lamp 5. Other holes are also provided in the cover to provide adequate ventilation. The base of this sub-assembly includes a mounting for the mirror 40 of Fig. 1 and also a lens and reflector right-angled rectangular housing mount 87 as shown in detail in Fig. 5. That is, light from the filament is reflected by mirror 40 through lens 41, the aperture in aperture plate 42, reflector 44, and reflector 45 to screen 37, as shown in Fig. 1. This entire lamp and optical unit may be quickly attached and detached from the base 70 for repair, and accurately replaced in view of dowels which accurately position the sub-assembly on the base 70.

The next sub-assembly houses the lenses 6, aperture plate 7, prism 12, and lens 13 of Fig. 1, and is shown as a substantially cylindrical bracket 89. This bracket is mounted to the main base as an independent unit which may be oriented and doweled in place. Lenses 6 and aperture plate 7 are assembled in a single demountable cell and mounted in the bracket nearest the lamp 5. Opposing screws 90 and 91 are provided in the bracket for independent aperture azimuth adjustment, the positioning dowels for the proper adjustment being shown at 92. (See Fig. 3.) The prism 12 is mounted at the end of the bracket 89 with a cover plate to provide accessibility thereto. The objective lens 13 is mounted in a housing 95 fitted into the side of the end of the bracket 89.

The galvanometer shown at 96 may be of the type described in co-pending Dimmick application, Serial No. 701,099, filed October 4, 1946, now Patent No. 2,492,275, granted December 27, 1949, and is mounted in a yoke to provide for adjustments thereof. That is, two ears, as shown at 97, are provided with adjustable mounting screws 98 to permit lateral adjustment of the yoke 100, which thereby adjusts the mirror 14 of Fig. 1 with respect to the light beam 25 and 26 reflected from prism 12. The galvanometer 96 is then mounted between the two legs 101 and 102 of the yoke 100 by pivot screws 103 and 104. The screws 103 and 104 are held in fixed position by set screws 106 and 107. To rotate the galvanometer on the screws 103 and 104, a thumb screw 110 is provided, threadedly mounted in a boss 111 and adapted to abut the lower portion of the galvanometer 96. When the screw 110 is backed off, a spring 113 rotates the galvanometer in the reverse direction. Thus, the galvanometer 96 may be quickly removed from the yoke 100 by loosening set screws 106 and 107 and backing off pivot screws 103 and 104.

The next rectangular shaped unit 115 houses the slit condenser 16, the recording slit plate 17, the housing of the final objective lenses 22, the filter lenses and the signal monitoring optics 21 and 57, as shown in Fig. 1. The slit condenser 16 and light slit plate 17 are mounted in a cell 116 providing a dust tight enclosure for the housing 115, the unit being attachable and detachable by screws such as shown at 117. The lens is held in the cell by a suitable spanner nut on the side nearest the galvanometer while the slit plate is retained on the opposite side of the cell. Slit azimuth orientation is accomplished by means of two opposing screws. The cell may be doweled in place in any suitable manner after final adjustment is once obtained. The objective lenses 22 are mounted in the barrel 120 at the other end of the housing 115.

The unit 115 may or may not house a noise reduction shutter unit as disclosed and claimed in Pettus co-pending application, Serial No. 739,484, filed April 4, 1947, now U. S. Patent No. 2,452,322, granted Oct. 26, 1948. When the shutter is used, one portion thereof is shown in Fig. 1 at 77, its purpose being to control the length of the monitoring image 38, as described in Sachtleben co-pending application, Serial No. 742,360, filed April 18, 1947. Also, positioned at the end of housing 115 nearest projection lenses 120 is a filter slide 121, the upper cross member of which is shown at 122. The slide and cross member are held together by a thumb screw 124 and the cross member is fastened to a cover plate 125 by screws 123. The cover plate 125 may be a flat plate or it may be a part of an integral signal monitoring sub-assembly which is attachable to and from the housing 115 by screws such as shown at 126. The filter slide 121 may have a light filter lens 201, such as an ultra-violet filter, mounted near one end and a plano-plano lens 202 mounted near the other end. The slide is reversible end for end so that either lens may be inserted in the recording light beam, the plano-plano lens compensating for changes in the optical path when the filter lens is removed.

Figures 8, 9:
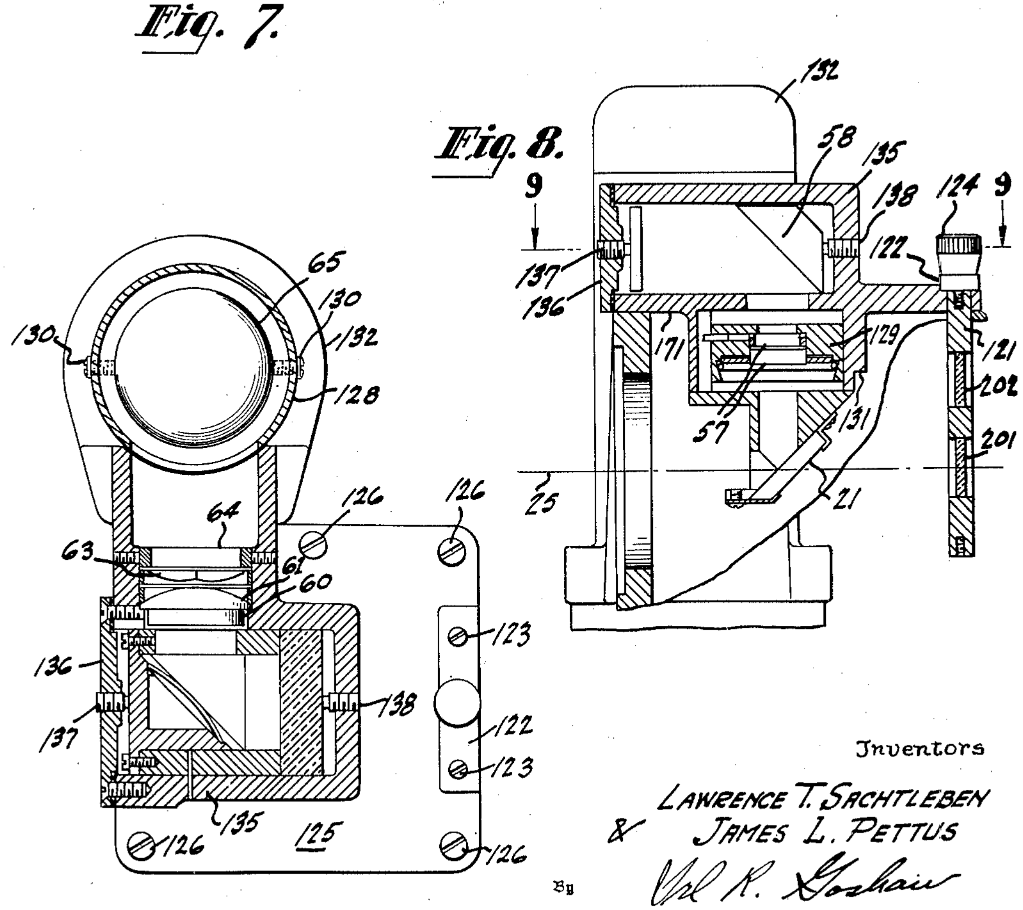
Fig. 8 is a cross-sectional view of the monitoring portion of the unit.
Fig. 9 is a cross-sectional view of the signal monitoring portion of the unit taken along the line 9—9 of Fig. 8.

For a description of the signal monitoring unit, reference is made to Figs. 8 and 9, wherein the dichroic reflector 21 is shown mounted at an angle of 45° to the light beam 25, to intercept and reflect the red end of the spectrum upwardly through cylindrical lenses 57 mounted in a cell unit 129 held in the casting 131. The light emerging from lenses 57 impinges on reflecting prism 58 where it is reflected to a second surface reflecting the light horizontally through the flat plate 60, cylindrical lens 61, aperture plate 62, splitting cylindrical lenses 63, and flat plate 64 to a photo-cell 65 held in a mount 128 by screws 130 under a cover 132. The prism 58 is mounted in the upper portion 135 of casting 131 and held in position by a cover 136. A pair of opposing screws 137 and 138 in the cover 136, and housing 135, respectively, permits adjustment of the prism 58 with respect to the vertical and horizontal axes of this optical path. The photo-cell output may be reproduced in a pair of headphones or in a loud-speaker to monitor the signal as it modulates the light beam. As mentioned above, this unit may or may not be used with the remaining portion of the optical system, it being detachable by the removal of screws 126, the cover 125 being replaced by a flat plate.

Figure 2:
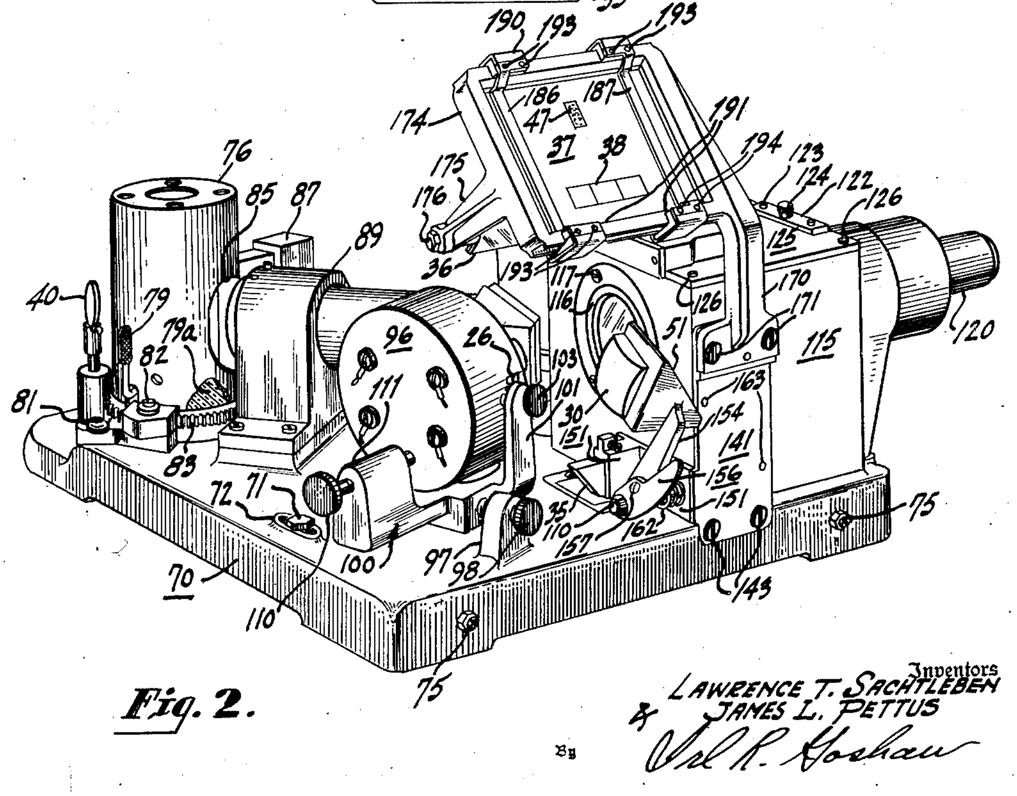
Fig. 2 is a perspective view of the unit as mounted on a recorder.
Figures 3, 4:
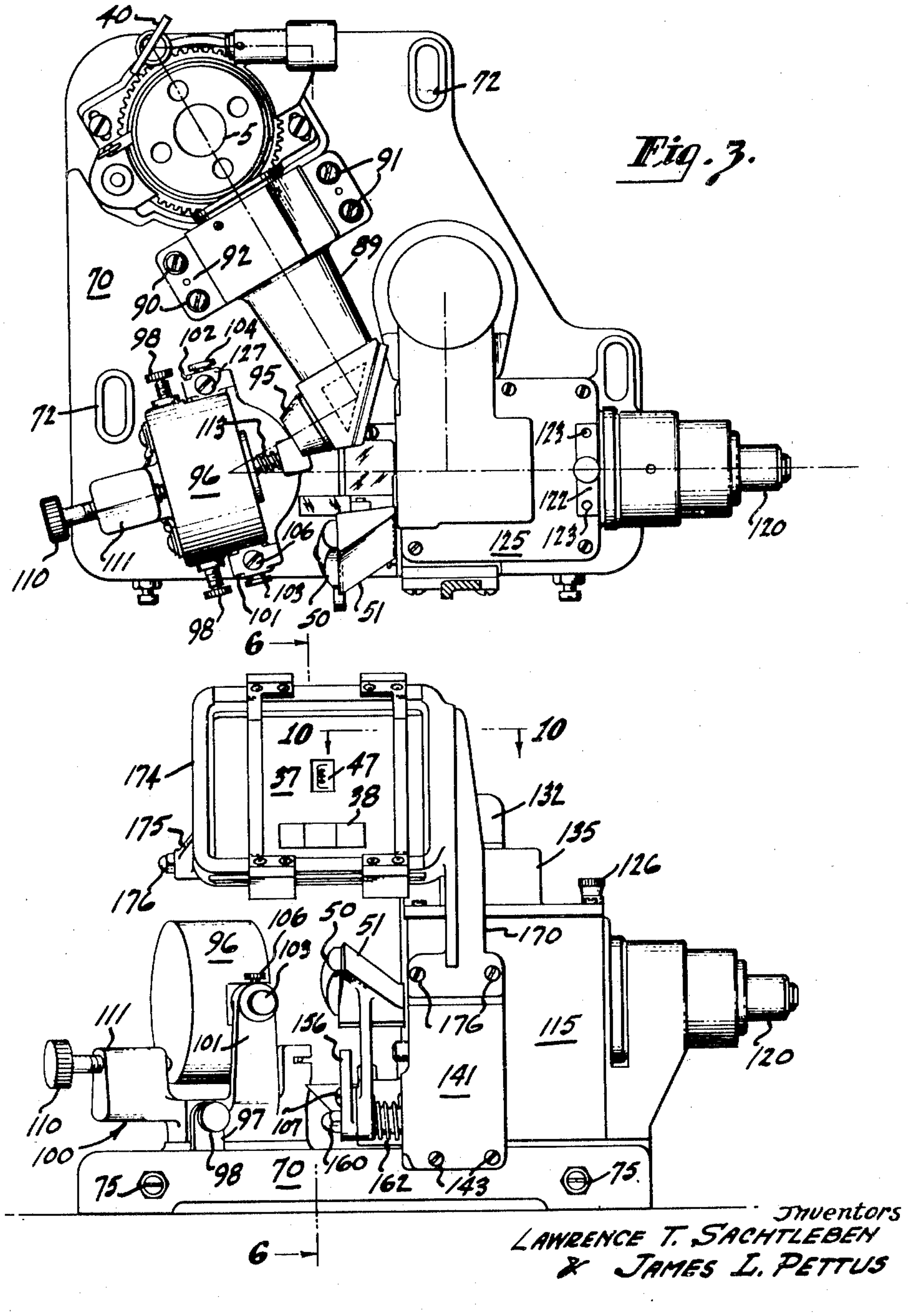
Fig. 3 is a plan view of the optical unit of Fig. 2.
Fig. 4 is a side elevational view of the unit shown in Fig. 2.
Figure 6:
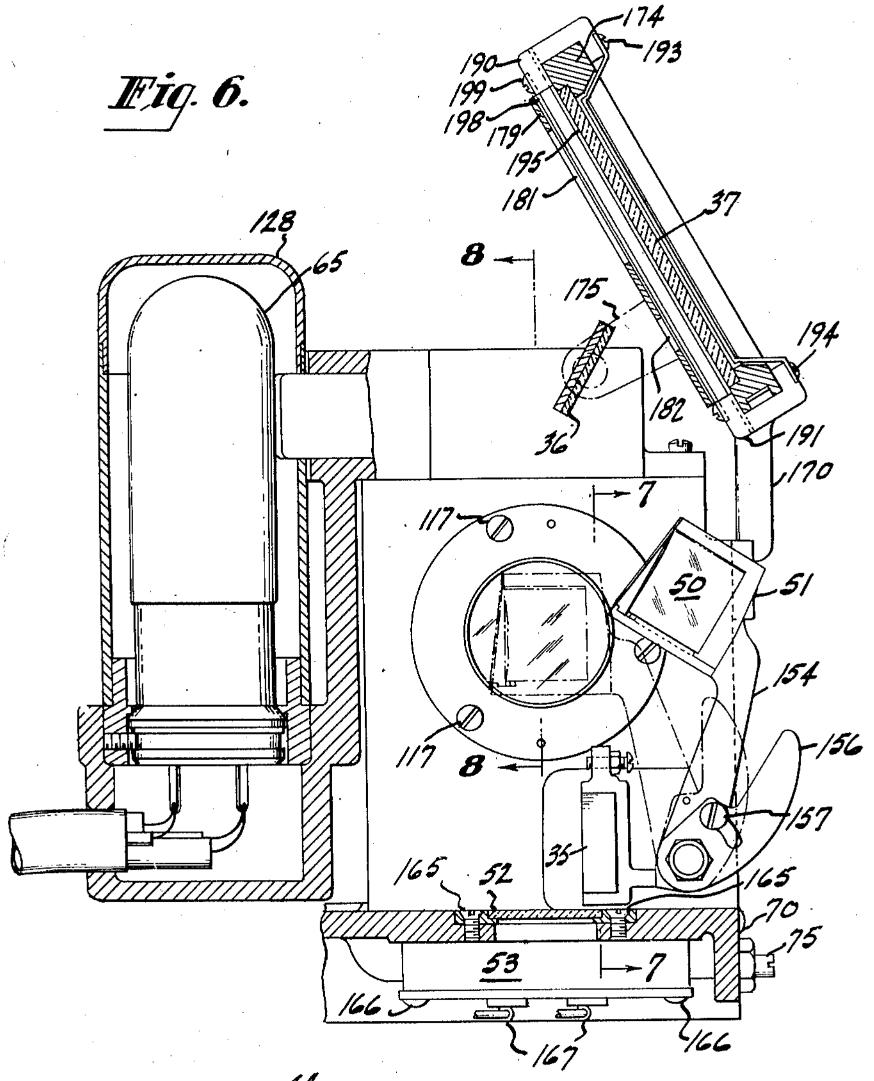
Fig. 6 is a cross-sectional view of the unit taken along the line 6—6 of Fig. 4.
Figure 7:
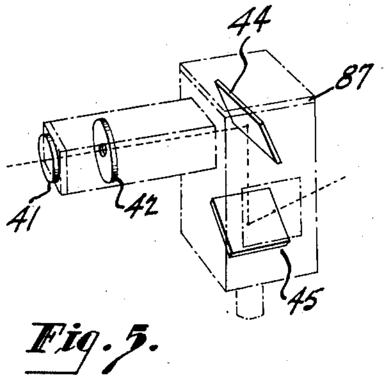
Fig. 7 is a detailed view of one sub-assembly of the monitoring portion of the system.
Figure 7:
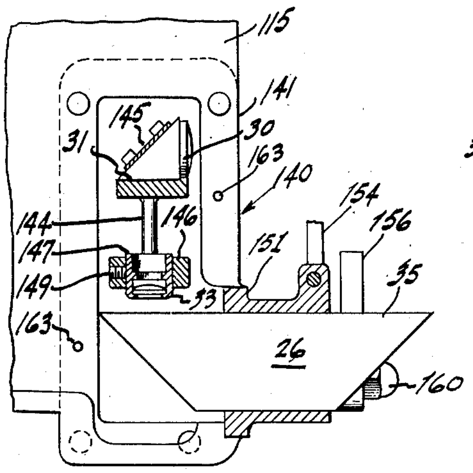
Figure 10:
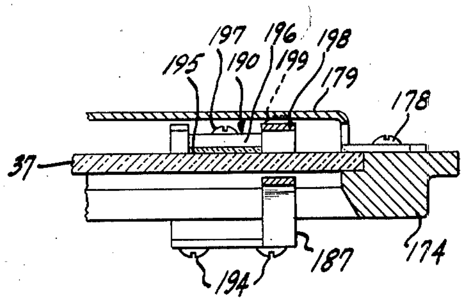
Fig. 10 is a detailed cross-sectional view taken along the line 10—10 of Fig. 4.

Also mounted in the lower left hand corner of housing 115 is an integral unit 140 (see Fig. 7) which includes the reflecting and magnifying optical units of the monitoring system and the optical elements of the light intensity meter. Referring now to Figs. 2, 6 and 7, this unit consists of an outer plate 141 having holes therein through which mounting screws 143 may pass to fasten the unit to housing 115. On the upper section 145 of a bracket 144, attached to the plate 141, the lens 30 and prism 31 are mounted. The lower portion 146 of the bracket has mounted therein a cylinder 147 which carries the magnifying lens 33. The lens 33 is adjustable axially in the portion 146 and held in adjusted position by a set screw 149. On the plate 141 and extending at right-angles thereto, is a bracket 151 on which is mounted the trapezoidal prism 35, the light rays 26 being reflected downwardly by prism 31 and then horizontally and upwardly by prism 35. (See Fig. 1.)

Also mounted on the bracket 151 is a pivoted arm 154 on which is supported the lens 50 and prism 51. The bracket 154 is attached to a curved arm 156 by a screw 157, both arms being pivoted on a screw 160. The lens 50 and prism 51 are normally held in a position out of the light beam 25 as shown in Fig. 2, and the solid lines in Fig. 6, by a coil spring 162 mounted on the shaft of the screw 160. The optical units 50 and 51, therefore, may be placed in the path of the recording light beam 25 by longitudinal movement of a plunger (not shown) passing through the front of the recorder which contacts the curved edge of the arm 156. (See dotted lines in Fig. 6.) The arms 154 and 156 may be adjusted with respect to one another by the position of screw 157 in the curved slot in arm 156. When the plunger is released the spring 162 returns the unit to the solid line position shown in Fig. 6. Thus, this sub-assembly permits the accurate optical positioning of the monitoring elements 30, 31, 33 and 35, as well as the metering optics 50 and 51, with respect to each other as a unit. These elements may be adjusted during the construction of the recorder and when their position has been determined the cover 141 may be doweled in place by dowels 163. The unit is quickly detachable from the housing 115 for any necessary cleaning and repair.

To complete the metering portion of the system, a glass or filter 52, or both, are mounted in an opening of the base plate 70 of the optical system by screws 165 and under which is mounted photo-voltaic cell 53 held in position by screws 166 and having electrical conductors 167 leading therefrom.

As described and claimed in Sachtleben copending application, Serial No. 742,360, filed April 18, 1947, the monitoring light beam 26 and the light beam for producing the image 47 of the filament are projected to the rear surface of a translucent screen 37 and at right-angles to this surface. The screen is mounted in a casting having an angular bracket arm 170, one end of which is attachable to the housing 115 by a pair of screws 171, while the upper end is tilted backwardly at an angle of approximately 30° from the vertical plane. The upper end of the casting is in the form of a substantially rectangular frame 174 with a rearwardly extending arm 175. In a hole in the end of the arm 175, the front surface reflecting mirror 36 is mounted by a screw 176. Thus, light from the prism 35 is reflected by mirror 36 normal to the rear surface of screen 37.

Referring now to Figs. 2, 4, 6 and 10, the ground glass screen 37 is mounted in recesses on the rear inner edges of the frame 174 and held in place by spring clips over which is attached a shield plate 179 having a rectangular opening 181 through which the image 47 is projected, and a horizontal rectangular opening 182 through which the image 38 is projected. The shield is attached by screws 178.

It will be noted that lines are provided in the position of image 38 to aid in the adjustment and observation of the modulating elements. To further aid in determining the limits of the proper adjustment of the light modulating elements, two narrow strips 186 and 187, having their ends attached to slide blocks 190 and 191, slideable along the upper and lower sections of the frame 174, are provided. These slides 186 and 187 follow the contour of the frame so that they lay closely adjacent the screen 37. They may be adjusted, therefore, for any desired position of the adjusted light image 38, so that the modulating element may be quickly readjusted in case of its removal from the entire unit.

The slide blocks 190 and 191 are U-shaped elements, strips 186 and 187 being attached thereto by screws 193 and 194. On the rear of the slide blocks are a pair of red gelatin strips, such as shown at 195, held in close contact with screen 37 by washers 196 and screws 197. The strips, such as shown at 198, keep the blocks 190 and 191 in proper position when fastened to the blocks by screws 199. The gelatin strips may be positioned with respect to slides 186 and 187 to indicate a dangerous condition of overmodulation, the red image providing a more noticeable indication.

The above optical assembly, therefore, provides a compact unit which provides a light source with its adjusting mechanism, a modulating element and its adjusting mechanism, a monitoring unit for the modulating light beam from the standpoints of position, intensity and its response to a signal, and a visual observation unit for the condition and position of the light source itself. It will be noted that each sub-assembly, as above described, may be independently adjusted and then attached to the system in a fixed position so that it may be returned thereto after it has been removed for cleaning or repair. Furthermore, most of the optical elements may be adjusted with respect to each other during construction of the sub-assemblies so that their optical paths may be accurately defined during construction and then fixed in the adjusted positions. This prevents misalignments during operation.

The plane of the modulation monitoring optics is in a vertical plane along the front of the unit, the light therefrom being projected normal to the observing screen surface so that when the image is viewed in line with the line of projection, maximum brightness of the image is provided. This optimum projection is also obtained for the light source image. Thus, each sub-assembly may have its individual optical elements independently adjusted with respect to each other, each sub-assembly may be positioned with respect to the other sub-assemblies on the optical unit base independently of the remainder of the recorder and the entire unit is attached to the recorder, the only final adjustment to be made being the proper placement of the light beam with respect to the film.

We claim:

1. An integral optical unit for generating, modulating, and projecting a light beam to a motion picture film comprising a base adjustable with respect to said film to align said light beam on a certain transverse portion of said film, an adjustable lamp assembly adjustably attachable at one corner of said base and adjustable vertically with respect to said base, a light projection assembly housing attachable to the opposite corner of said base to project light to said film, a light modulator adjustably attachable to another corner of said base, a light beam forming and projection assembly adjustably attachable to said base intermediate said lamp assembly and said modulator to increase the projection path of said light beam from said lamp assembly to said film, a unitary monitoring assembly attachable to said light projection assembly housing for receiving light from said lamp and projecting it upwardly in a vertical plane, said monitoring assembly including an integral unit mounted substantially entirely within said light projection assembly housing and having an optical element thereof extending externally of said housing, an optical unit pivoted on the said last mentioned assembly for intercepting light from said lamp when said unit is moved into the path of light from said modulator to said projection assembly, a light sensitive device mounted in said base for receiving said last mentioned light to measure its intensity, means within said light projection assembly for intercepting a portion of the light projected toward said film for monitoring the signal being recorded, a bracket attached to said light projection assembly housing and having a substantially rectangular frame, and an observation screen mounted in said frame for observing the action of said modulator, said frame and observation screen being tilted at an angle of approximately 30° to a vertical plane.

2. An optical unit in accordance with claim 1 in which an L-shaped housing is provided on said lamp assembly, said housing enclosing light reflecting and projecting elements for projecting an image of said lamp at right-angles to the surface of said observation screen.

3. An optical unit for attachment to a film recorder comprising a base adjustably attachable to said recorder for adjusting said unit with respect to a film in said recorder, a lamp mount adjustably attachable to said base at one corner thereof, said lamp being vertically adjustable on said mount, a light projecting unit attached to said base at the opposite corner thereof, said unit comprising a rectangular casing having an opening at the top and at one side thereof, a modulator adjustably attachable to said base at a third corner thereof, a light beam forming unit adjustably attachable to said base intermediate said lamp mount and said modulator, said unit projecting light toward the center of said base and then to said modulator, a plate adapted to be attached to said casing and cover said side opening therein, said plate having attached thereto monitoring optical elements, one of said elements extending externally of said casing, a rectangular frame mounted to the side of said casing and tilted approximately thirty degrees from the vertical plane of said casing, an extension from said frame for supporting optical elements cooperating with said monitoring elements, and a screen mounted within said frame.

4. An optical unit in accordance with claim 3 in which said rectangular casing has a cover portion for closing the opening at the top thereof, a housing integral with and passing through said cover and containing deflecting and projecting light elements, and a photocell housing attached to said first mentioned housing.

5. An optical unit in accordance with claim 3 in which a pivoted optical unit is mounted on said first mentioned assembly for intercepting light at will from said modulator, means being provided on said base for measuring the intensity of said light.

6. An optical unit for a sound film recorder comprising a base attachable to and adjustable on said recorder, a lamp mount assembly attachable longitudinally and vertically to and adjustable on said base, a modulator unit attachable to and adjustable on said base, a light forming and light directing assembly attachable to and adjustable on said base between said lamp assembly and said modulator unit, said light path being from said lamp toward the center of said base and then at right angles to said modulator, a substantially rectangular housing having a top opening and a side opening, said housing being attachable to said base, a top plate for closing the upper opening of said housing, a casing integral with said plate extending into said housing and externally of said housing for passing light from said modulator therethrough, a plate for closing the side opening of said housing, said plate carrying optical elements for passing light from said modulator externally of said housing, a bracket mounted on said housing, said bracket having a frame tilted at an angle to the side of said housing, and a light observing screen mounted in said frame for receiving light from inside said housing and directly from said lamp.

7. An optical unit in accordance with claim 6 in which a T-shaped housing is mounted on said lamp mount assembly to pass light from said lamp to said screen to form an image of the filament of said lamp on said screen.

8. An optical unit in accordance with claim 6 in which said screen includes a translucent plate at an angle of approximately 30° to said vertical plane and a plurality of opaque and color sliders adjustable over the surfaces of said plate are provided to define predetermined limits of modulation.

LAWRENCE T. SACHTLEBEN.
JAMES LAWRENCE PETTUS.

REFERENCES CITED

The following references are of record in the file of this patent:

UNITED STATES PATENTS

| Number | Name | Date |
|---|---|---|
| 1,955,378 | Dimmick | Apr. 17, 1934 |
| 2,233,907 | Zimmerman | Mar. 4, 1941 |
| 2,238,291 | Runge | Apr. 15, 1941 |
| 2,270,350 | Schomacker | Jan. 20, 1942 |
| 2,413,051 | Iborra | Dec. 24, 1946 |